United States Patent
Sohn

[11] Patent Number: 6,116,112
[45] Date of Patent: Sep. 12, 2000

[54] SELF-COMPENSATING DYNAMIC BALANCER

[75] Inventor: Jin-seung Sohn, Seoul, Rep. of Korea

[73] Assignee: Samsung Electronics Co., Ltd, Kyungki-do, Rep. of Korea

[21] Appl. No.: 09/222,946

[22] Filed: Dec. 30, 1998

[30] Foreign Application Priority Data

Dec. 31, 1997 [KR] Rep. of Korea ............... 97-82104

[51] Int. Cl.[7] .................................................. F16F 15/32
[52] U.S. Cl. ............................................................ 74/573 R
[58] Field of Search ........................... 74/573 R, 574, 74/573 F

[56] References Cited

U.S. PATENT DOCUMENTS 5,857,360  1/1999  Kim et al. ................. 74/573 R X

FOREIGN PATENT DOCUMENTS

| 0 829 872 | 3/1998 | European Pat. Off. . | |
|---|---|---|---|
| 0 836 185 | 4/1998 | European Pat. Off. . | |
| 49-10563 | 1/1974 | Japan . | |
| 5152586 | 10/1974 | Japan . | |
| 55-151285 | 4/1979 | Japan . | |
| 55-156682 | 4/1979 | Japan . | |
| 58-1300892 | 8/1983 | Japan . | |
| 60-97444 | 7/1985 | Japan ............................ | 74/574 |
| 1597643 | 10/1990 | U.S.S.R. ......................... | 74/573 R |
| WO 98/03974 | 1/1998 | WIPO . | |

OTHER PUBLICATIONS

Japanese Office Action and its English Translation, dated Aug. 31, 1999.
Patent abstracts of Japan vol. 014, No. 540(M–1053), Nov. 29, 1990 & JP 02 229940 A (Copal Electron Co Ltd), Sep. 12, 1990 *Abstract.
Patent Abstracts of Japan vol. 015, No. 266 (P–1223), Jul. 5, 1991 & JP 03 086968 A (Fujitsu Ltd) Apr. 11, 1991 *Abstract.
Patent Abstracts of Japan vol. 014, No. 376 (P1092), Aug. 14, 1990 & JP 02 139758 A (Canon Inc) May 29, 1990, *Abstract.

*Primary Examiner*—Mary Ann Battista
*Attorney, Agent, or Firm*—Sughrue, Mion, Zinn, Macpeak & Seas, PLLC

[57] ABSTRACT

A self-compensating dynamic balancer is coupled to a rotating body to reduce internal vibrations generated due to eccentric mass of the rotating body. The balancer includes a main body having a circular race formed therein and being concentric with a rotation shaft of the rotating body, a plurality of moving members disposed in the race and capable of moving, and a cover member coupled to the main body to cover the race. An outer wall of the race is formed to guide movements of the moving members such that each of the moving members is operative to contact the outer wall of the race during the rotation of the main body. Also, at least one protrusion is formed on the surface of the cover member facing the moving members and/or the bottom of the race to guide movements of the moving members by selectively contacting the moving members, when the rotating body rotates while being oriented vertically.

3 Claims, 5 Drawing Sheets

SELF-COMPENSATING DYNAMIC BALANCER

BACKGROUND OF THE INVENTION

1. Field of the Invention

The present invention relates to a self-compensating dynamic balancer, and more particularly, to a self-compensating dynamic balancer having an improved structure so that the time required for balancing can be reduced and balancing performance can be improved when a rotating body rotates in a vertical direction.

2. Description of the Related Art

In general, a disk player records/reproduces information on/from an optical disk in a non-contact method. As the rotational speed of a spindle motor installed in the disk player increases, detrimental internal vibrations may be generated. The internal vibrations are generated mainly due to the revolution of the rotation center of a rotating body, that is, whirling, which is caused by disparity between the rotation center and the center of mass of the rotating body. The eccentric mass of the rotating body is produced by an error in a manufacturing process of the rotating body such as a disk. Thus, a self-compensating dynamic balancer is adopted to reduce the internal vibrations.

FIGS. 1 and 1A show a conventional self-compensating dynamic balancer for reducing internal vibrations. The self-compensating dynamic balancer consists of a case 10 and a plurality of rigid bodies 40 provided in the case 10. The case 10 includes a main body 20 having a circular race 21 in which the rigid bodies 40 are placed and a cover member 30 covering an open portion of the main body 20.

A coupling hole 35 for coupling a rotation shaft 51 of a driving source 50 to the case 10 is formed at the center of the cover member 30. The circular race 21 is a space in which the rigid bodies 40 can freely move and is concentric with the center of the coupling hole 35. Thus, when the case 30 rotates, the rigid bodies 40 located in the race 21 tend to move away from the rotation center of the rotation shaft 51 due to a centrifugal force. In this case, when the rotation shaft 51 revolves due to eccentric mass, the rigid bodies 40 are located opposite to the center of mass with respect to the rotation shaft 51 so that the internal vibrations due to the eccentric mass can be reduced.

In the self-compensating dynamic balancer having the above structure, the diameter of a circle made by the circular race 21, the diameter and mass of each of the rigid bodies 40, and the number of rigid bodies 40 are determined considering a normal rotation speed of a rotating body such that the internal vibrations due to the unbalanced mass of the rotating body are reduced.

In the conventional self-compensating dynamic balancer, however, while performing a balancing operation, the rigid bodies 40 do not stop quickly at balancing positions due to weak damping between the rigid bodies 40 and the race 21. Also, since the rigid bodies 40 contact surfaces of the outer wall and the bottom of the race 21, the rigid bodies 40 are easily abraded and the whole balancing performance deteriorates. Further, when fluid is injected inside the race 21 to induce strong damping, reproducibility of a balancer is lowered due to surface tension.

Also, when the above self-compensating dynamic balancer is installed vertically, since the rigid bodies 40 are naturally disposed in the lower portion of the race 21 due to the pull of gravity, it is difficult for the rigid bodies 40 to move to their balancing positions.

SUMMARY OF THE INVENTION

To solve the above problems, it is an objective of the present invention to provide a self-compensating dynamic balancer having a structure which can reduce the contact area between the moving members and the race and curtail the time needed for the rigid bodies to move to balancing positions.

Accordingly, to achieve the above objective, there is provided a self-compensating dynamic balancer which is coupled to a rotating body to reduce internal vibrations generated due to eccentric mass of the rotating body, the balancer comprising: a main body having a circular race formed therein and being concentric with a rotation shaft of the rotating body; a plurality of moving members disposed in the race and capable of moving; and a cover member coupled to the main body to cover the race. In the self-compensating dynamic balancer having the above structure, an outer wall of the race is formed to guide movements of the moving members such that each of the moving members is operative to contact the outer wall of the race during the rotation of the main body, and at least one protrusion is formed on the surface of the cover member facing the moving members and/or the bottom of the race to guide movements of the moving members by selectively contacting the moving members, when the rotating body rotates while being oriented vertically.

BRIEF DESCRIPTION OF THE DRAWINGS

The above objective and advantages of the present invention will become more apparent by describing in detail a preferred embodiment thereof with reference to the attached drawings, in which:

FIG. 1A is a magnified view of a portion of FIG. 1;

DETAILED DESCRIPTION OF THE INVENTION

Figure 1:
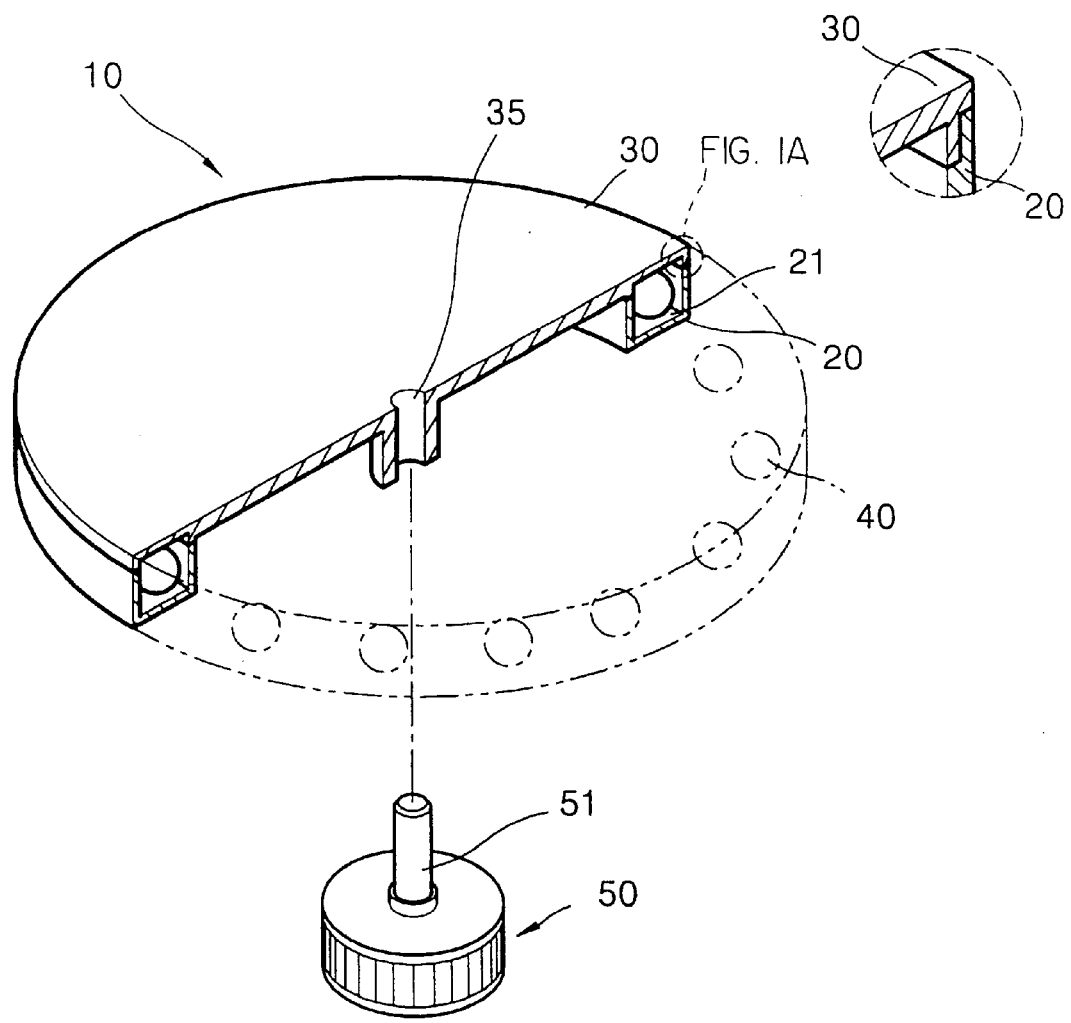
FIG. 1 is a partially cut-away perspective view illustrating the conventional self-compensating dynamic balancer.
Figure 2:
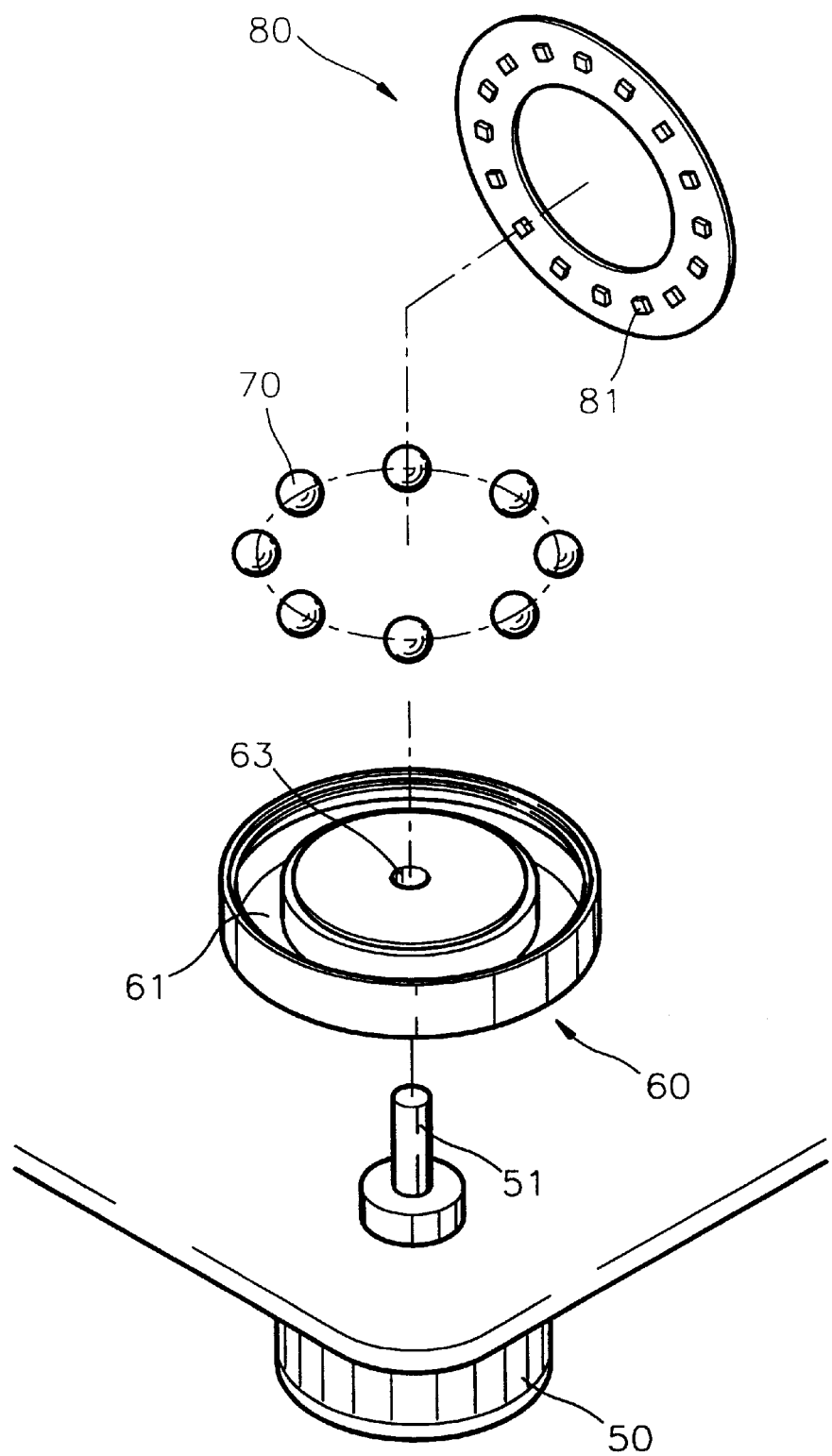
FIG. 2 is an exploded perspective view illustrating a self-compensating dynamic balancer according to a preferred embodiment of the present invention.

FIG. 2 shows a self-compensating dynamic balancer according to a preferred embodiment of the present invention. Referring to the drawing, the self-compensating dynamic balancer of the present invention includes a main body 60 having a circular race 61 formed therein, a plurality of moving members 70 located in the race and capable of moving, a cover member 80 coupled to the main body 60 to cover the race 61, and a plurality of protrusions 81 formed on the surface of the cover member 80 facing the moving members 70 at predetermined intervals along radial direction.

A coupling hole 63 is formed at the center of the main body 60. The coupling hole 63 is coupled to a rotation shaft 51 of a driving source 50 which provides a rotational force.

Thus, the main body 60 is rotated by the rotational force provided from the driving source 50.

The entire upper portion of the main body 60 of the race 61 can be open to enable insertion of the moving members 70, as shown in FIG. 2, or alternatively, only a part of the upper portion of the race 61 may be open such that the moving members 70 can be inserted into the race 61. The moving members 70 move in a radial direction toward the positions, opposing the center of the main body 60, by the centrifugal force generated during rotation of the main body 60.

When the moving members 70 move in the race 61 to appropriate compensating positions as the race 61 rotates at a high speed, the moving members 70 move both in an axial direction and a direction perpendicular to the axial direction. That is, since the moving members 70 are influenced by the centrifugal force generated due to the rotation of the race 61, they slidingly contact the race 61 in the axial direction and rollingly contact the race 61 in the axial-perpendicular direction.

By using the above physical principle, if the moving members 70 are made not to contact the bottom of the race 61, the overall frictional force is reduced and accordingly balancing performance improves.

Figure 3:
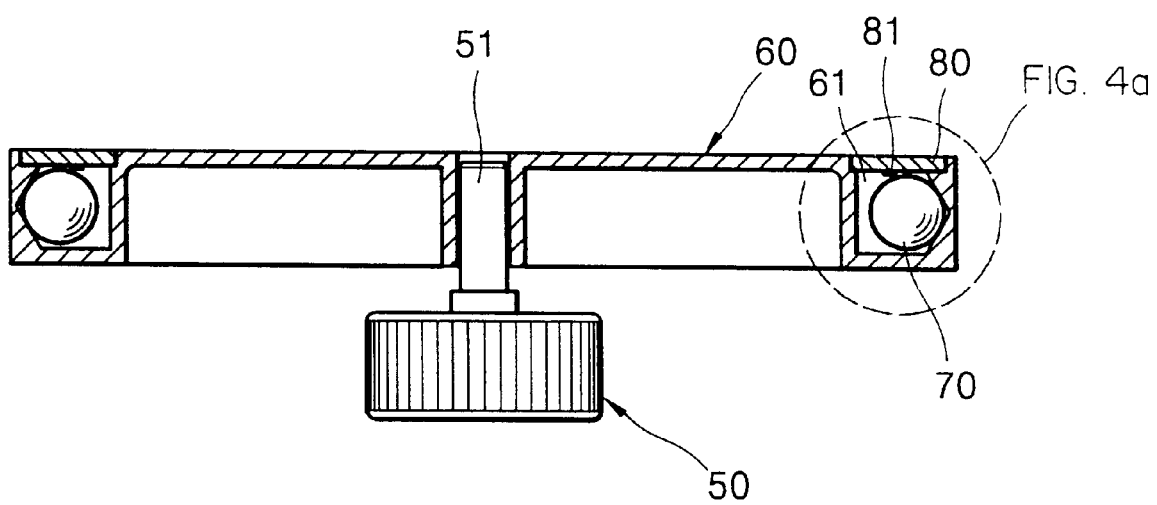
FIG. 3 is a sectional view of the self-compensating dynamic balancer shown in FIG. 2.
Figure 4A:
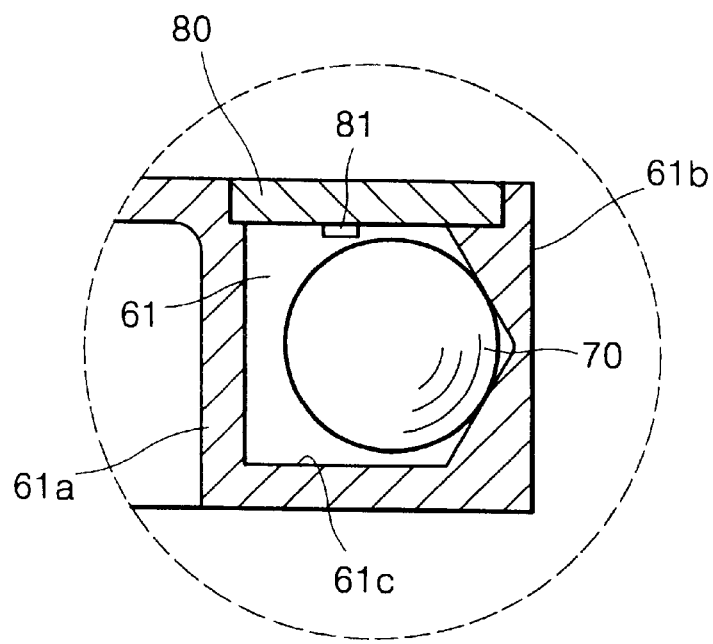
FIG. 4A is a magnified sectional view of FIG. 3.
Figure 4B:
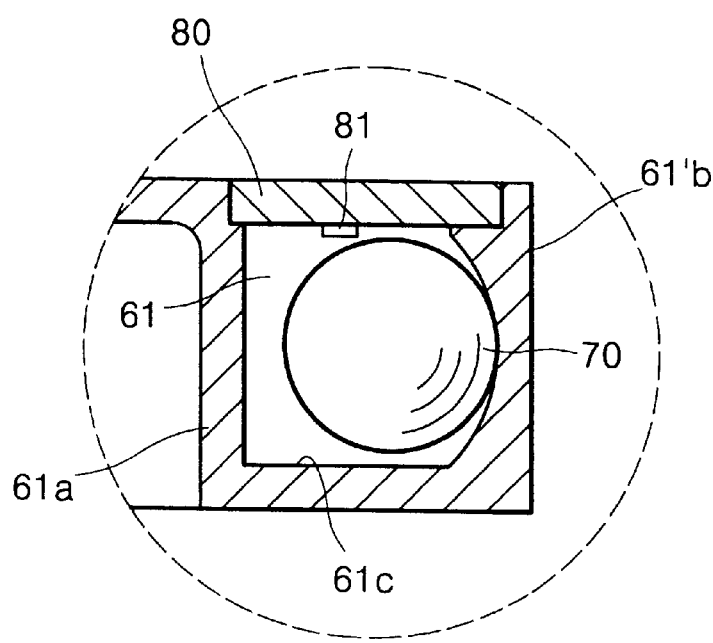
FIG. 4B is a view similar to FIG. 4A but showing an alternative configuration.

In consideration of the above, according to the present invention as shown in FIGS. 3, 4A, and 4B, the race 61 has an inner wall 61a, a bottom surface 61c, and an outer wall 61b. The outer wall 61b is formed to guide the movement of the moving members 70 as each of the moving members 70 contacts the outer wall 61b of the race 61 by the centrifugal force generated when the main body 60 rotates.

FIG. 4A is a magnified view of FIG. 3. Referring to FIG. 4A, the inner wall 61a of the race 61 is formed to be perpendicular to the bottom surface 61c and parallel to the outer wall 61b. The outer wall 61b is formed to have a notch in the middle portion thereof such that the moving members 70 are separated from the bottom surface 61c of the race 61 and the protrusions 81 by the centrifugal force when the main body 60 rotates. Thus, a precise processing of the bottom surface 61c is not needed, and further, the frictional force due to the contact between the moving members 70 and the race 61 can be reduced.

FIG. 4B is similar to FIG. 4A but shows an attachment configuration, wherein the outer wall 61'b of the race 61 is formed to be parallel to the inner wall 61a thereof and perpendicular to the bottom surface 61c and the middle, inwardly facing portion of the outer wall 61'b is formed to be roundly concave. Thus, a precise processing of the bottom surface 61c is not needed, and further, the frictional force due to the contact between the moving members 70 and the race 61 can be reduced.

The protrusions 81 are provided for a case in which the main body 60 is installed vertically, that is, the race 61 is installed to be upright with respect to the center of rotation. The protrusions 81 selectively contact the moving members 70 according to the rotation speed of the main body 60 which is installed vertically.

When the main body 60 does not rotate, the moving members 70 are disposed in the lower portion of the race 61 due to their weight. In this case, the moving members 70 mostly contact the outer wall 61b of the race 61 and a part of the moving members 70 contact the surface of the cover member 80 facing the moving members 70 or the bottom surface 61c.

When the main body 60 rotates at a low speed, the moving members 70 move toward the lower portion of the race 61 as the weight of each moving member is greater than the centrifugal force. At this time, the protrusions 81 being in contact with the moving members 70 guide the movements of the moving members 70. Thus, when the main body 60 rotates at a normal speed enabling the balancing operation, the moving members 70 overcome the weight thereof, or the pull of gravity, and the time needed to move to appropriate balancing positions can be shortened. When the main body 60 rotates at the normal speed, the moving members 70 are in rolling-contact with the outer wall 61b having a notch or rounded shape while being separated from the bottom surface 61c and the protrusions 81. Accordingly, the protrusions 81 do not interfere with the movements of the moving members 70 during the balancing operation.

Figure 5:
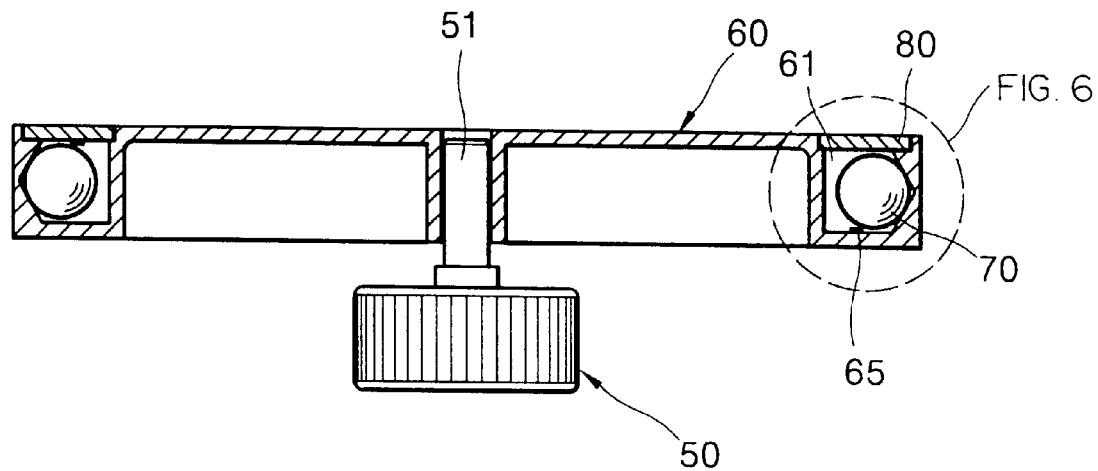
FIG. 5 is a sectional view of a self-compensating dynamic balancer according to another preferred embodiment of the present invention.
Figure 6:
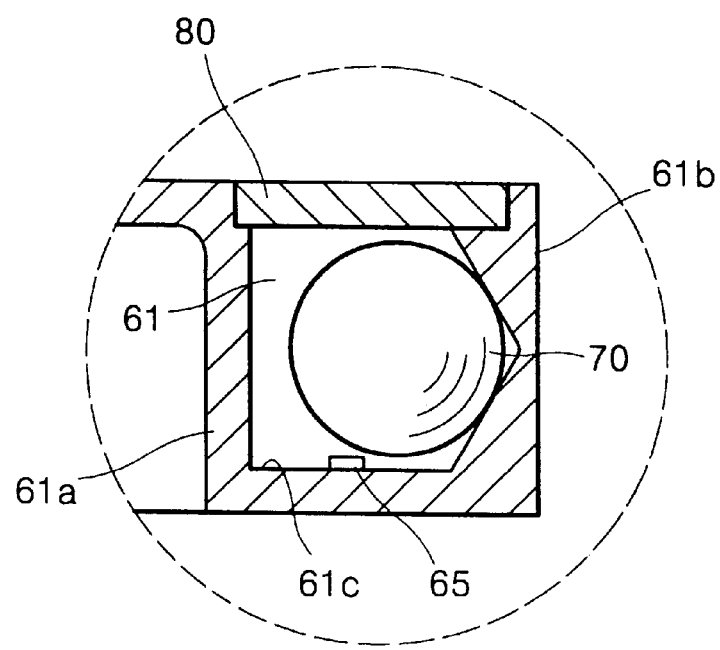
FIG. 6 is a magnified sectional view of FIG. 5.

Referring to FIG. 5, a self-compensating dynamic balancer according to another preferred embodiment of the present invention includes a main body 60 having a race 61 formed therein, a moving member 70 placed in the race 61 capable of moving, a cover member 80 coupled to the main body 60 to cover the race 61, and a plurality of protrusions 65 formed on the bottom of the race 61 at predetermined intervals.

The protrusions 65 are provided for a case in which the main body 60 is installed vertically, that is, the race 61 is installed to be upright with respect to the center of rotation. The protrusions 65 are formed on the bottom 61c of the race facing the moving members 70 and selectively contact the moving members 70 according to the rotation speed of the main body 60.

When the main body 60 does not rotate, the moving members 70 are disposed in the lower portion of the race 61 due to their weight. In this case, the moving members 70 mostly contact the outer wall 61b of the race 61 and a part of the moving members 70 contact the surface of the cover member 80 facing the moving members 70 or the protrusion 65 on the bottom surface 61c.

When the main body 60 rotates at a low speed, the moving members 70 move toward the lower portion of the race 61 as the weight of each moving member is greater than the centrifugal force. At this time, the protrusions 65 being in contact with the moving members 70 guide the movements of the moving members 70. Thus, when the main body 60 rotates at a normal speed enabling the balancing operation, the moving members 70 overcome the weight thereof, or the pull of gravity, and the time needed to move to appropriate balancing positions can be shortened. When the main body 60 rotates at the normal speed, the moving members 70 are in rolling-contact with the outer wall 61b having a notch or rounded shape while being separated from the protrusions 65 and the surface of the cover member 80 facing the moving members 70. Accordingly, the protrusions 65 do not interfere with the movements of the moving members 70 during the balancing operation.

Also, it is possible for the protrusions to be formed both on the surface of the cover member 80 facing the moving members 70 as shown in FIG. 3 (protrusion 81) and on the bottom 61c of the race 61 as shown in FIG. 5 (Protrusion 65).

As described above, in the self-compensating dynamic balancer according to the present invention, the shape of the outer wall of the race is formed such that the moving members contact the outer wall only during the balancing operation. Also, when the main body is installed vertically, the protrusions formed on the cover member facing the moving members and/or the bottom of the race can reduce the time needed for the moving members to move to appropriate balancing positions.

What is claimed is:

1. A self-compensating dynamic balancer which is coupled to a rotating body to reduce internal vibrations generated due to eccentric mass of said rotating body, said balancer comprising:

a main body having a circular race formed therein and being concentric with a rotation shaft of said rotating body, said race having an inner wall, an outer wall, and a bottom;

a plurality of moving members disposed in said race and being operative to move; and a cover member coupled to said main body to cover said race, wherein said outer wall of said race is formed to guide movements of said moving members such that each of said moving members is operative to contact said outer wall of said race during rotation of said main body, and a plurality of circumferentially spaced-apart protrusions formed on a surface of at least one of said cover member facing said moving members and said bottom of said race to guide movements of said moving members by selectively contacting said moving members, when said rotating body rotates while being oriented vertically.

2. The self-compensating dynamic balancer as claimed in claim 1, wherein said outer wall of said race is formed to be roughly perpendicular to said bottom of said race and parallel to said inner wall of said race, and said outer wall is formed to have a notch at a middle portion thereof so that said moving members are operative to be separated from said bottom of said race and said protrusions due to centrifugal force during the rotation of said main body.

3. The self-compensating dynamic balancer as claimed in claim 1, wherein said outer wall of said race is formed to be roughly perpendicular to said bottom of said race and parallel to said inner wall of said race, and said outer wall is formed to be round concavely at a middle portion thereof so that said moving members are operative to be separated from said bottom of said race and said protrusions due to centrifugal force during the rotation of said main body.

* * * * *